United States Patent Office 2,862,850
Patented Dec. 2, 1958

2,862,850

DITHIOCARBAMATE RODENT REPELLENT COMPOSITIONS AND METHODS

Lyle D. Goodhue, Bartlesville, Okla., assignor to Phillips Petroleum Company, a corporation of Delaware No Drawing. Application July 12, 1954
Serial No. 442,889

12 Claims. (Cl. 167—46)

This invention relates to repelling rodents. In one aspect this invention relates to methods for using an N,N-dimethyl sulfenyl dithiocarbamate to repel rodents. In another aspect this invention relates to rodent repellent compositions containing as an essential active ingredient an N,N-dimethyl sulfenyl dithiocabamate. Other aspects will be apparent from that which follows.

The problem of attack of growing trees and other nursery stock, as well as certain plants, by rodents, particularly rabbits, has become serious in some localities. In many instances, the problem is also serious in buildings which are used for storage of various products. Any material which has a repellent action toward rodents would be highly useful and advantageous when applied to objects which are subject to attack by rodents.

It has now been found that the N,N,-dimethyl sulfenyl dithiocarbamates are effective repellents for rabbits, rats and mice. Therefore, these compounds are useful for the protection of various stored products against the ravages of rodents and are particularly useful for the protection of nursery stock and other growing plants against rabbits. They are effective when used in very small quantities because rabbit food treated with 0.1 weight percent of this compound will prevent feeding even to the point of starvation.

Thus according to the invention there is provided a method whereby an attractant material normally consumed as food by rodents, for example rabbits, is rendered repellent and is thereby protected from said rodents which comprises incorporating with said material a repelling amount of an N,N-dimethyl sulfenyl dithiocarbamate.

Also according to the invention there are provided rodent repellents containing as an essential active ingredient an N,N-dimethyl sulfenyl dithiocarbamate.

The compounds of this invention can be prepared by any convenient method. One method for the preparation of said compounds comprises reacting an alkali metal salt of an N-substituted dithiocarbamate with an aliphatic sulfenyl thiocyanate. Further details regarding this method of preparing said compounds can be found in U. S. Patent 2,390,713. Another method for the preparation of the compounds of the invention comprises reacting a lower alkyl sulfenyl halide with salts of N-substituted dithiocarbamic acid in aqueous solution as disclosed and claimed in the copending application of C. M. Himel et al., Serial No. 406,049, filed January 25, 1954, which is a continuation-in-part of Serial No. 180,-317, filed August 18, 1950, now abandoned, which was a continuation-in-part of Serial No. 772,218, filed September 4, 1947, now abandoned. The latter method of preparation is a presently preferred method.

Specific compounds applicable to the present invention are N,N-dimethyl-S-methylsulfenyl dithiocarbamate and N,N-dimethyl-S-tert butylsulfenyl dithiocarbamate.

The effectiveness of N,N-dimethyl-S-methylsulfenyl dithiocarbamate and N,N-dimethyl-S-tert-butylsulfenyl dithiocarbamate as rodent repellents and, therefore, of the claimed invention was unpredictable. The action of these compounds is shown by comparative tests using related compounds. Dithiocarbamates other than those claimed have been found ineffective. Many other sulfur and nitrogen containing compounds which were tested have been found ineffective for use as rodent repellents. Results of comparative tests are given below. Several of the compounds there found to be ineffective as rodent repellents were ineffective even at relatively large concentrations of five times as great as those employed, i. e., at 0.5 weight percent concentration.

The rodent repellent can be applied by various means. When paper or cloth bags, used as containers for attractant materials normally consumed as food by rodents, are impregnated with a compound of the present invention, an effective barrier is provided which prevents entrance of rodents to the material contained therein. It can be incorporated into gum rosin or similar adjuvant material and applied as a protective coating for fruit trees. It can be dissolved or dispersed in any suitable carrier and applied by spraying, brushing, or other means.

Examples of suitable solvents or carriers include straight and branched chain hydrocarbons such as n-pentane and isoheptane, cyclic paraffinic hydrocarbons containing at last five carbon atoms such as cyclooctane and mixtures of such hydrocarbons. Talc, kieselguhr and other inert carriers may be used in preparing dusts. Water may be used advantageously to form emulsions of said compounds for spraying. When preparing aqueous emulsions, wetting or emulsifying agents such as Triton X–100 (alkyl aryl polyether alcohol), Dresinate 731 (sodium salt of a disproportionated rosin acid), Tween 20 (sorbitan monolaurate polyethylene oxide) and the like are employed in sufficient quantity to stabilize the emulsion. For best and now greatly preferred results, in any event, the compositions of the invention, as applied, are made up to contain a repellent adjuvant to dilute the active ingredients to an effective, but not undesirably high, concentration. Generally, the repellent adjuvants known in the art can be employed; however, those set forth are now preferred. Solutions or emulsions containing from 1 to 20 percent by weight of the active ingredient can be employed to incorporate said active ingredient with the material being treated.

Tests were made on a number of compounds to determine their effectiveness as rabbit repellents. The results of these tests are given in the following examples. When testing a compound as a rodent repellent, one animal was used for each test. In the early work the tests were allowed to run a week, but it was learned that four days were sufficient to determine whether an animal would eat so the test period was fixed at four days for later work. If a compound is an active enough repellent to prevent feeding to the point of starvation, the animal will refuse to eat food impregnated with the compound and will eventually starve to death. A healthy animal was employed in each test and, after the test was discontinued, the animal was fed until it was in good condition and could be used again.

EXAMPLE I

A pelleted commercial brand of rabbit food was treated at the rate of 0.1 percent by weight, based on the food, with the compound dissolved in enough acetone to be completely absorbed by said food. The food was spread out in a tray and allowed to dry 24 hours and then offered to the rabbits. Observations were made twice daily to determine whether any food was consumed. The following results were obtained:

| | Effect of compound tested |
|---|---|
| N,N - dimethyl - S - tert - butylsulfenyl dithiocarbamate | Complete repellency. |
| N,N - dimethyl - S - methylsulfenyl dithiocarbamate | Complete repellency. |
| N,N - diethyl - S - tert - butylsulfenyl dithiocarbamate | Not repellent. |
| N - tert - butyl - S - tert - butylsulfenyl dithiocarbamate | Not repellent. |
| N - isopropyl - S - tert - butylsulfenyl dithiocarbamate | Not repellent. |
| N,N - di - n - propyl - S - tert - butylthiosulfenyl dithiocarbamate | Not repellent. |
| N,N - di - n - dodecyl - S - tert - butylsulfenyl dithiocarbamate | Not repellent. |
| N-cyclohexyl-S-tert-butyl sulfenamide | Not repellent. |
| N,N - (3 - oxapentamethylene) - S - tert - butylsulfenyl dithiocarbamate | Not repellent. |
| N,N' - ethylene - bis(tert - butylsulfenyl dithiocarbamate) | Not repellent. |
| N,N' - diethylene - bis(tert - butylsulfenyl dithiocarbamate) | Not repellent. |
| Di-tert-butylsulfenyl trithiocarbonate | Not repellent. |
| S - tert - butyl - S' - tert - butylthiosulfenyl trithiocarbonate | Not repellent. |
| S - ethyl - S' - tert - butylthiosulfenyl trithiocarbonate | Not repellent. |
| Tert-butylthiosulfenylpiperidine | Not repellent. |
| Diethyl ester of pyridine-2,5-dicarboxylic acid | Not repellent. |
| Hexadecyl mercaptan | Not repellent. |
| 4-ethanolpyridine | Not repellent. |
| Ethyl-N-ethyl-N-phenyl carbamate | Not repellent. |
| Benzeneazodiphenylamine | Not repellent. |
| Diphenyl sulfoxide | Not repellent. |
| Diphenyl sulfone | Not repellent. |

The N,N-dimethyl-S-tert-butylsulfenyl dithiocarbamate and N,N-dimethyl-S-methylsulfenyl dithiocarbamate prevented feeding completely while the other compounds appeared to have no effect on the consumption of the food.

EXAMPLE II

N,N-dimethyl-S-tert-butylsulfenyl dithiocarbamate was tested for its effectiveness as a repellent for mice using 0.1 percent by weight, based on the food, as in the above tests. This material was a strong repellent with feeding occurring only sparingly near the point of starvation.

It will be noted that the repellents of this invention repel excellently at concentrations of 0.1 weight percent. It is considered that a candidate repellent must repel excellently at this concentration in order to be acceptable.

From the foregoing tests it will be noted that the compounds which are effective according to this invention are N,N-dimethyl compounds and in this respect differ from the other dithiocarbamates tested. It is clear therefore that the N,N-dimethyl portion must be present as a component of the molecule to render the same repellent and cause it to have the specific action. Example III given below illustrates the repellency of N,N-dimethyl-S-tert-butylsulfenyl dithiocarbamate for rats.

EXAMPLE III

N,N-dimethyl-S-tert-butylsulfenyl dithiocarbamate was tested as a rat repellent according to the following procedure (method described in greater detail in Modern Packaging for May 1950):

The compound was mixed with ground laboratory diet to form mixtures containing the indicated concentration of the dithiocarbamate. Individually caged laboratory rats were given two food cups, one containing 20 grams of the treated food and the other containing 20 grams of similar untreated food. Food consumption was determined daily during the test period and the repellent activity of the dithiocarbamate was expressed numerically according to the formula:

$$\text{Repellency } (K) = 100 - \frac{1}{100W}(8T_1+4T_2+2T_3+T_4)(U_1+U_2+2U_3+4U_4+8X)$$

where $T_1 \ldots T_4$ represent the consumption in grams of the treated food on the respective days of the test, $U_1 \ldots U_4$ represent the daily consumption of the untreated food, $W$ is the body weight in kilograms of the test rats and $X$ represents the weight of untreated food remaining at the end of the test. On the basis of numerous tests it has been found that compounds with K values above 85 are of sufficient interest to warrant further investigation.

The dithiocarbamate was tested at concentrations of 0.5, 1.0 and 2.0 weight percent in the food. As shown by the K value in the following table, this compound is an excellent rat repellent.

*Repellency of N,N-dimethyl-S-tert-butylsulfenyl dithiocarbamate toward rats*

| Conc. | Type Bait[2] | Total Food Accepted (Av.)[1] (gm.) | | | | K Value |
|---|---|---|---|---|---|---|
| | | 1-da. | 2-da. | 3-da. | 4-da. | |
| 0.5% | T | 0.02 | 0.2 | 0.34 | 1.08 | 98 |
| | U | 5.20 | 13.54 | 19.2 | 20.0 | |
| 1% | T | 0.6 | 0.14 | 0.44 | 1.28 | 98 |
| | U | 6.26 | 15.22 | 20.0 | | |
| 2% | T | 0.08 | 0.08 | 0.18 | 0.48 | 99 |
| | U | 1.92 | 14.46 | 19.40 | 20.0 | |

[1] Average food acceptance (5 laboratory rats).
[2] T—Treated. U—Untreated.

Reasonable variation and modification are possible within the scope of the foregoing disclosure and the appended claims to the invention the essence of which is that N,N-dimethyl sulfenyl dithiocarbamates, for example, N,N-dimethyl-S-methylsulfenyl dithiocarbamate and N,N-dimethyl-S-tert-butylsulfenyl dithiocarbamate, have been found to be effective repellents for rodents, for example rats and rabbits, as described herein.

I claim:

1. A method for protecting growing plants and other materials normally consumed as food by rodents which comprises applying to said plants and other materials, in an amount sufficient to effectively repel said rodents, a compound selected from the group consisting of N,N-dimethyl-S-tert-butylsulfenyl dithiocarbamate and N,N-dimethyl-S-methylsulfenyl dithiocarbamate, incorporated with an inert repellent adjuvant as a carrier therefor.

2. The method of claim 1 wherein said compound is N,N-dimethyl-S-tert-butylsulfenyl dithiocarbamate.

3. The method of claim 1 wherein said compound is N,N-dimethyl-S-methylsulfenyl dithiocarbamate.

4. The method of claim 2 wherein said repellent adjuvant is gum rosin.

5. The method of claim 3 wherein said repellent adjuvant is gum rosin.

6. The method of claim 1 wherein said repelling amount is not more than 0.1 percent by weight.

7. A method whereby young nursery stock normally consumed as food by rodents is protected from damage by rodents which comprises admixing with a gum rosin inert repellent adjuvant as a carrier therefor, from 1 to 20 weight percent of a compound selected from the group consisting of N,N-dimethyl-S-tert-butylsulfenyl dithiocarbamate and N,N-dimethyl-S-methylsulfenyl dithiocarbamate and spreading said admixture on said nursery stock in an amount sufficient to effectively repel said rodents.

8. The method of claim 7 wherein said compound is N,N-dimethyl-S-tert-butylsulfenyl dithiocarbamate.

9. The method of claim 7 wherein said compound is N,N-dimethyl-S-methylsulfenyl dithiocarbamate.

10. A rodent repellent composition containing as an essential active ingredient from 1 to 20 weight percent of a compound selected from the group consisting of N,N-dimethyl-S-tert-butylsulfenyl dithiocarbamate and N,N-dimethyl-S-methylsulfenyl dithiocarbamate, incorporated with a gum rosin inert repellent adjuvant as a carrier therefor.

11. The composition of claim 10 wherein said compound is N,N-dimethyl-S-tert-butylsulfenyl dithiocarbamate.

12. The composition of claim 10 wherein said compound is N,N-dimethyl-S-methylsulfenyl dithiocarbamate.

References Cited in the file of this patent

UNITED STATES PATENTS

| | | |
|---|---|---|
| 1,871,949 | Bottrell | Aug. 16, 1932 |
| 2,043,941 | Williams | June 9, 1936 |
| 2,222,638 | Szilard | Nov. 26, 1940 |
| 2,222,639 | Perk | Nov. 26, 1940 |
| 2,390,713 | Hunt | Dec. 11, 1945 |
| 2,598,989 | Goodhue et al. | June 3, 1952 |
| 2,621,143 | Goodhue et al. | Dec. 9, 1952 |

OTHER REFERENCES

Frear: Chemistry of Insecticides, Fungicides and Herbicides, P. Van Nostrand, 1948, pp. 289–290.